(12) United States Patent
Anger et al.

(10) Patent No.: US 7,019,228 B2
(45) Date of Patent: Mar. 28, 2006

(54) METHOD FOR CONTROLLING A DISPLACEABLE ELECTRICAL SWITCHING MODULE

(75) Inventors: Nils Anger, Berlin (DE); Karsten Fleck, Oberkrämer Ortsteil Marwitz (DE); Ralph Löser, Birkenstein (DE); Dietrich Rudolph, Berlin (DE); Holger Schumann, Berlin (DE); Jay Schwartz, Mobil, AL (US)

(73) Assignee: Siemens Aktiengesellschaft, Munich (DE)

( * ) Notice: Subject to any disclaimer, the term of this patent is extended or adjusted under 35 U.S.C. 154(b) by 15 days.

(21) Appl. No.: 10/493,247

(22) PCT Filed: Oct. 22, 2002

(86) PCT No.: PCT/DE02/04020

§ 371 (c)(1),
(2), (4) Date: Apr. 21, 2004

(87) PCT Pub. No.: WO03/038964

PCT Pub. Date: May 8, 2003

(65) Prior Publication Data

US 2005/0006211 A1 Jan. 13, 2005

(30) Foreign Application Priority Data

Oct. 22, 2001 (DE) .................. 101 53 108

(51) Int. Cl.
*H01H 9/20* (2006.01)
*H01H 33/666* (2006.01)
*H01H 33/46* (2006.01)
*H02B 11/00* (2006.01)
*H02B 5/00* (2006.01)

(52) U.S. Cl. .............. 200/50.01; 200/50.21; 200/400; 218/1; 218/45; 218/120; 218/153; 218/154; 361/605; 361/615

(58) Field of Classification Search ..... 200/50.01–50.4, 200/400, 401; 218/1–117, 118–158; 361/605–621
See application file for complete search history.

(56) References Cited

U.S. PATENT DOCUMENTS 3,502,834 A * 3/1970 Field et al. ................ 218/140
3,772,489 A * 11/1973 Wilson ...................... 218/154
6,177,641 B1 * 1/2001 Morel et al. ............. 200/50.26
6,184,483 B1 * 2/2001 Coudert et al. .......... 200/50.21

FOREIGN PATENT DOCUMENTS

GB       2013980 A * 8/1979

* cited by examiner

*Primary Examiner*—James R. Scott
(74) *Attorney, Agent, or Firm*—Morrison & Foerster LLP

(57) ABSTRACT

The invention relates to a method for controlling an electrical switching module which can be displaced between an entry position and an exit position. The switching module comprises switching contacts of vacuum switching tubes; an isolating element which can be also be displaced in the switching module and comprises isolating contacts which can be connected to, and disconnected from, corresponding mating contacts inside an enclosed switchboard section, as required; and connector contacts and mating connector contacts in the low voltage range. The switching contacts of the vacuum switching tubes support the closing and opening processes, under the control influence of a closing spring which can be influenced by a closing catch (EK) and an opening spring which can be influenced by an opening catch, and prominent functional positions of the isolating position. Only the isolating contacts are disconnected from the mating contacts in a test position which is situated between the operational position and the isolating position. The connector contacts are also disconnected from the mating connector contacts in the isolating position of the isolating element. When the switching module is switched from the isolating position to the exit position, the closing spring and the opening spring are forced into an unstressed state. One such method is used to control displaceable switching modules in medium voltage switchboard sections.

4 Claims, 1 Drawing Sheet

METHOD FOR CONTROLLING A DISPLACEABLE ELECTRICAL SWITCHING MODULE

CLAIM FOR PRIORITY

This application claims priority to International Application No. PCT/DE02/004020, which was published in the German language on May 8, 2003, which claims the benefit of priority to German Application No. 101 53 108.7 which was filed in the German language on Oct. 22, 2001.

TECHNICAL FIELD OF THE INVENTION

The invention relates to a method for controlling an electrical breaker module, which can be moved between an "inserted position" and a "withdrawn position" and to a control device for carrying out the method.

BACKGROUND OF THE INVENTION

The principle of the design of a medium-voltage switchgear panel of the type defined initially is described in the SIEMENS Company document Leistungsschalter-Einschubanlagen Typ NXAIR M, [NXAIR M withdrawable power breakers], 2000 supplement to Catalog HA 25.71, chapter 4, pages 10 to 13. More details on the breaker module of the type defined initially are described in the same document, chapter 4, page 14.

Reference should be made to the relevant regulations and specifications for switchgear panels such as this, in particular in connection with aspects relating to personnel protection and operational safety, in chapter 5, page 19, of this document.

Chapter 5, page 20 of this document also makes reference to the regulations in VDE 0670 and IEC 60298 for interlocks which are associated with the invention. Reference is then also made in chapter 4, page 15, to the conditions for interlocks going beyond these regulations.

The basic functioning and operation of the closing and opening springs of an electrical breaker module are described in the SIEMENS Company document Vakuum-Leistungsschalter 3AF, [3AF vacuum power breakers], instruction manual, order No. SW 8516 b, in particular in the chapter entitled Antrieb [Mechanism], pages 3/1 to 3/4.

SUMMARY OF THE INVENTION

The invention relates to a method for controlling an electrical breaker module, which can be moved between an "inserted position" and a "withdrawn position", having switching contacts for vacuum interrupters and a disconnecting part, which can also be moved in the breaker module, having disconnecting contacts which can be connected to and disconnected from, as required, corresponding opposing contacts within an encapsulated switchgear panel, in particular a medium-voltage switchgear panel, and having plug contacts and opposing plug contacts in the low-voltage range, the switching contacts of the vacuum interrupters being under the controlling influence of a closing spring, which can be influenced by a closing latch (EK), and an opening spring, which can be influenced by an opening latch (AK), for the purpose of assisting in the closing and opening operations, and clearly defined functional positions of the disconnecting part being represented by an "operating position" and by a "disconnected position", and to a control device for carrying out the method.

In one embodiment of the invention, there is a method for controlling the breaker module and a control device which is capable of doing so, which method and device can be used to meet both the existing specifications and also additional, further-reaching conditions, the control device being of compact design, and it being possible to use the control device almost universally and to a large extent irrespective of the switching contacts used in the breaker module.

By introducing an additional "test position" between the "operating position" and the "disconnected position" for the disconnecting part which can be moved and by thus increasing the subdivision into smaller, clear functional steps, the control operations necessary for mutual interlocking and release can be produced in a simple manner by correspondingly short switching sequences which are grouped according to function for moving the breaker module from the "inserted position" to the "withdrawn position".

It is also possible to use simple and reliable mechanical means to control any additional requirement for the total unloaded state of the closing and opening springs when moving the breaker module to the "withdrawn position".

The switching sequences which are grouped according to function are produced, in conjunction with a relatively simple control device.

A single lifting lever is thus provided, whose cross-sectional profile is U-shaped for reinforcement purposes and which has two control contours of different design which are used to control the closing latch for the closing spring and the opening latch for the opening spring of the switching contacts according to the specifications. In the process, the U-shaped lifting lever is deflected in the vertical direction at a different lifting height. This takes place in interaction with the pivot lever which is mounted such that it can rotate and which can itself pivot radially by means of a lift-control lever representing the different functional positions. In the process, the different control contours at the free ends of the lifting lever interact with the different sliding rollers to move the corresponding actuating levers of the closing and opening latches so that the springs responsible for the corresponding switching operations (the closing spring for the closing operation and the opening spring for the opening operation) can thus be controlled according to their function with respect to their loaded or unloaded spring states.

According to one advantageous embodiment of the invention, the sliding rollers are moved by the vertically deflected lifting lever by means of sloping slide edges such that the closing and opening latches each follow radial deflections.

Furthermore, the sliding pin is used to reverse the interlocking, which was previously required, of the closing latch again in order to ensure that the springs provided for the mechanism (the closing spring and the opening spring) are unloaded, as is required when moving the breaker module to the "withdrawn position".

In the direction of its linear deflection, the lifting lever is provided on both sides with an elongated hole in which the second actuating lever is fixed in position such that it can rotate on the lifting lever.

In its totality, the control device is thus designed such that the required unloaded state of the closing and opening springs results when the breaker module is withdrawn from the encapsulated switchgear panel to the "withdrawn position".

Furthermore, in functional positions of the disconnecting part, i.e. in the "operating position", in the "test position" and in the "disconnected position", when closing and opening attempts are made which overlap one another in time (whether these attempts are made manually by operating personnel on site or automatically and remotely from a control center), the switching contacts of the breaker module are preferably caused to open as long as the opening attempt is being made. If the opening attempt is successful, the linear deflection of the lifting lever with a sliding roller sliding along its sloping slide edge effects sliding deflection with the result that an actuating lever of the opening latch experiences a radial deflection. As a result, the pin lever which is firmly connected to th rotatable closing latch interlock is deflected radially such that the closing latch interlock is moved from the release position to the interlocking position.

The closing latch radial deflection is thus blocked, and it can no longer be actuated. As long as this state lasts, this is also true for the actuation of the closing latch, which is triggered manually via a pushbutton or automatically via a control center. Each closing attempt is therefore unsuccessful.

If the closing attempt lasts longer than the opening attempt, or if the closing attempt is initiated again once the opening attempt is complete, the initial situation is achieved again with the result that the switching contacts can again be closed using the closing latch, which is in the release position.

On the other hand, if the two criteria (the closing attempt and the opening attempt) occur at the same time and the closing spring is still loaded, the closing operation takes place over a short period of time owing to the closing latch, which is initially in the release position. However, the closing latch interlock (as described above) is then immediately moved to the interlocking position of the closing latch.

These closing and opening operations, which take place immediately one after the other, are permissible and can be used to monitor the switching operations taking place in the switchgear panel.

If only the closing operation is effectively initiated, the linear deflection of the lifting lever causes the opening operation (as described above) to be initiated again.

BRIEF DESCRIPTION OF THE DRAWINGS

The invention is described in more detail by an exemplary embodiment illustrated in two figures.

DETAILED DESCRIPTION OF THE INVENTION

In the figures, the parts which are partially hidden in both views but whose contours are necessary for understanding the invention are shown only by broken lines.

Figure 1:
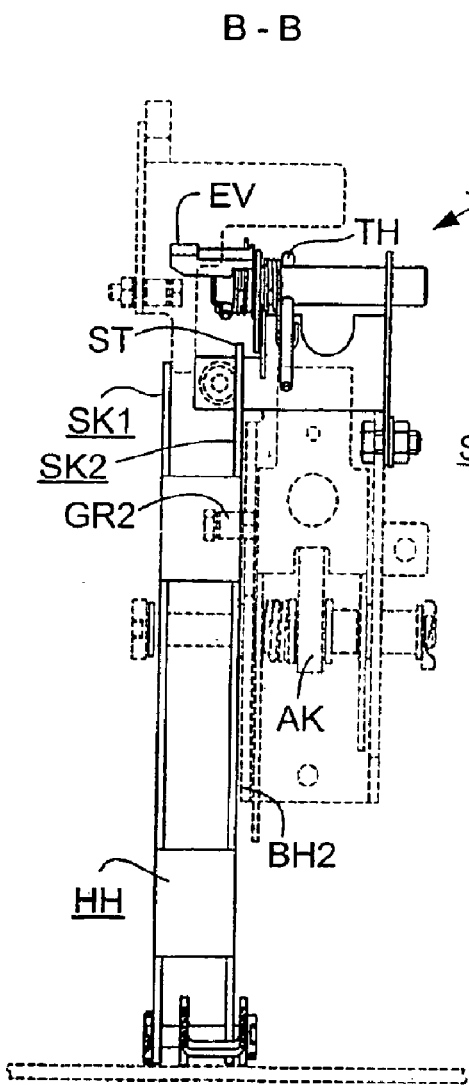
FIG. 1 shows a front view of the control device with the lifting lever along the sectional plane.

To better illustrate the individual functional sequences, both the position of the closing latch interlock EV in the release position FS of the closing latch and the position of the closing latch interlock EV in the interlocking position VS of the closing latch are illustrated by shading. This is also true for the second actuating lever BH2 and the pin lever TH (FIG. 1), the broken, shaded lines showing the state in which the closing latch interlock EV is in the release position FS, and the continuous, shaded lines showing the state in which the closing latch interlock EV is in the interlocking position VS.

Figure 2:
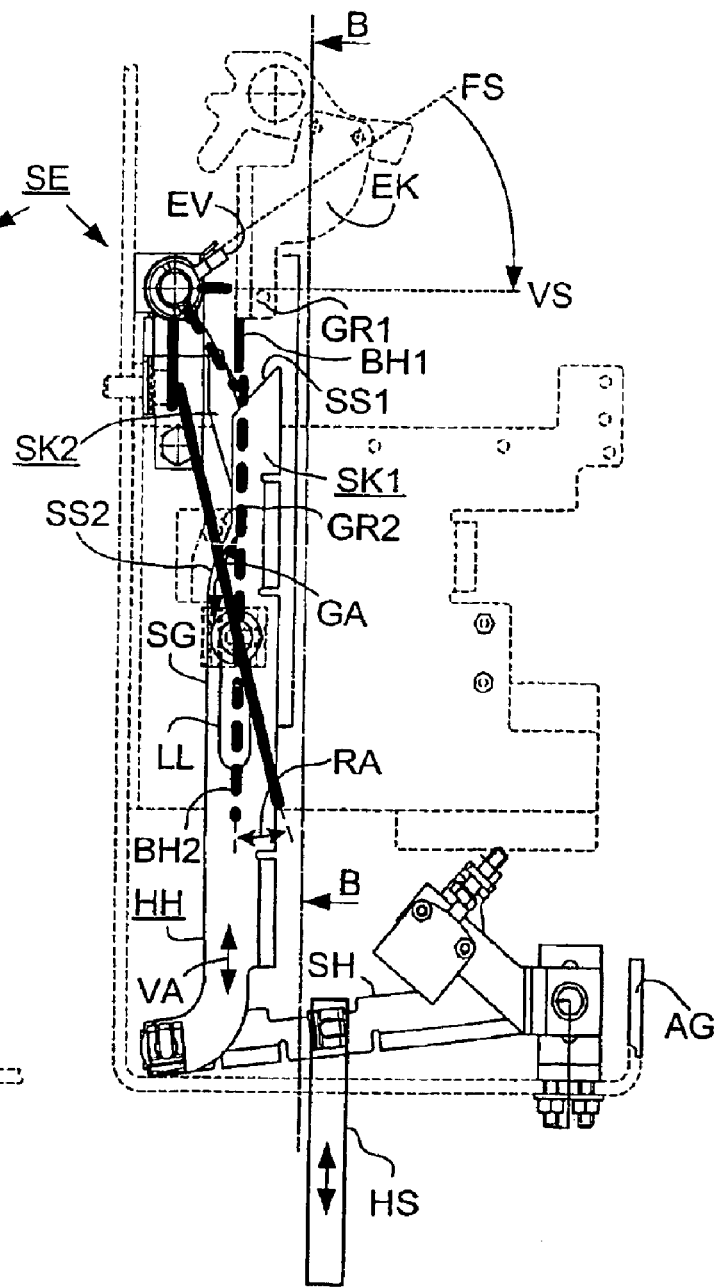
FIG. 2 illustrates a side view of the position of the lifting lever within the mechanism housing of the control device.

FIG. 2 also shows the vertical mechanism of the lifting lever HH by means of the lift-control lever HS which represents different functional positions and is guided such that it can slide along an angled, profiled rod (not illustrated) within a breaker module (likewise not illustrated). The recesses and protrusions present there which are dependent on the positions deflect the lifting lever HH in the vertical direction. Furthermore, it may also be seen from FIG. 2 that the lifting lever HH, whose cross-sectional profile is U-shaped, is mounted within the mechanism housing AG at one end such that it can rotate and is provided, opposite its rotational mounting in the pivot lever SH, with different, functionally related control contours SK1, SK2 at its free ends.

The starting position of the control device SE, which is intended here to represent the "operating position" of the breaker module, envisages that the second sliding roller GR2 of the lifting lever HH is right at the start of the second sloping slide edge SS2, which extends downwards, and in this position the second actuating lever BH2 is not yet influenced by the radial deflection RA.

The closing latch EK is not blocked while the plug contacts are connected in an electrically conductive manner to the opposing plug contacts in the low-voltage range. At the same time, the disconnecting contacts are also electrically conductively connected to the opposing contacts in the main voltage range.

When the disconnecting part is moved from the "operating position" towards the "disconnected position", the intermediate "test position" is reached initially. The second control contour SK2 of the lifting lever HH is used, at the start of its upward, vertical deflection, in a first switching sequence to guide, using its second sloping slide edge SS2, the second sliding roller GR2 along the sliding deflection GA. The second actuating lever BH2, which is mounted such that it can rotate and is rigidly connected to the second sliding roller GR2, in this case experiences the radial deflection RA and thus releases the opening latch AK.

The second actuating lever BH2 then engages with the pin lever TH such that the closing latch interlock EV is deflected from the release position FS of the closing latch EK to the interlocking position VS of the closing latch EK. The closing latch EK is blocked in this state, and thus the closing spring for the switching contacts is prevented from being effective.

With further deflection of the lifting lever HH, in the transition from the "disconnected position" to the "withdrawn position" (the second sliding roller GR2 is then located in the region of the straight slide edge SG of the lifting lever HH), the sliding pin ST of the second control contour SK2 of said lifting lever HH connects with the closing latch interlock EV, in which the closing latch EK is located in the interlocking position VS.

This second switching sequence is complete when the sliding pin ST of the second control contour SK2 has moved the closing latch interlock EV back to the original starting position, the release position FS of the closing latch EK, and thus the closing latch EK is no longer blocked. This switching sequence and the subsequent release of the closing latch EK by the effect of the first control contour SS1 on the first sliding roller GR1 and the associated deflection of the first actuating lever BH1 causes the closing spring to be unloaded in order to make it possible to cause the switching contacts to be opened directly afterwards using the opening latch AK, which is released in the first switching operation.

This state is reached when the breaker module is moved to the "withdrawn position", i.e. no longer in the "disconnected position".

Corresponding safety regulations which prescribe the unloading of all spring mechanisms of the switching contacts in this functional position, such as the American ANSI specification C 37.04., paragraphs 6.7.3 and 6.9, are therefore met using this control device.

What is claimed is:

1. A control device for controlling an electrical breaker module, which can be moved between a first position and a second position, comprising:

switching contacts of vacuum interrupters and a disconnecting part, which are configured to be moved in the breaker module;

disconnecting contacts configured for connection to and disconnected from corresponding opposing contacts within an encapsulated switchgear panel; and plug contacts and opposing plug contacts in a low-voltage range, the switching contacts of the vacuum interrupters being under the controlling influence of a closing spring, which is influenced by a closing latch, and an opening spring, which is influenced by an opening latch, to assist in closing and opening operations, and positions of the disconnecting part being represented by a third position and a fourth position, wherein the disconnecting contacts are disconnected from the opposing contacts in a fifth position of the disconnecting part which is provided between the third position and the fourth position, the plug contacts are disconnected from the opposing plug contacts in the fourth position of the disconnecting part, and when moving the breaker module from the fourth position to a sixth position, the closing spring and the opening spring are transferred to an unloaded spring state by control contours.

2. A method for controlling an electrical breaker module, which can be moved between a first position and a second position, comprising:

switching contacts of vacuum interrupters and a disconnecting part, which are configured to be moved in the breaker module;

disconnecting contacts configured for connection to and disconnected from corresponding opposing contacts within an encapsulated switchgear panel; and plug contacts and opposing plug contacts in a low-voltage range, the switching contacts of the vacuum interrupters being under the controlling influence of a closing spring, which is influenced by a closing latch, and an opening spring, which is influenced by an opening latch, to assist in closing and opening operations, and positions of the disconnecting part being represented by a third position and fourth position, wherein the disconnecting contacts are disconnected from the opposing contacts in a fifth position of the disconnecting part which is provided between the third position and the fourth position, the plug contacts are disconnected from the opposing plug contacts in the fourth position of the disconnecting part, and when moving the breaker module from the fourth position to a sixth position, the closing spring and the opening spring are transferred to an unloaded spring state by the control contours.

3. The method as claimed in claim 2, wherein the control device has a pivot lever which is mounted to rotate within the mechanism housing and is controlled by a lift-control lever, the pivot lever is connected at a free end to a lifting lever, which is mounted to rotate and has a U-shaped cross-sectional contour, the lifting lever is provided, opposite a rotational mounting, with functionally related control contours at free ends, a first control contour being connected by a first sliding roller to a first actuating lever of the closing latch, and a second control contour being connected by a second sliding roller to a second actuating lever of the opening latch, and the control device has a closing latch interlock, which is mounted to rotate within the mechanism housing and controls the closing latch and, is controlled by the second control contour, interlocks the closing latch, and, controlled by the first control contour, releases the closing latch.

4. The method as claimed in claim 3, wherein the first control contour has a first sloping slide edge which points outwards and extends upwards in a straight line, the second control contour has a sliding pin, which points inwards and extends upwards and, a second sloping slide edge extending downwards, and the lifting lever is provided on both sides with one slot in which the second actuating lever is fixed in position to rotate on the lifting lever.

* * * * *